(12) United States Patent
Patel et al.

(10) Patent No.: US 6,266,386 B1
(45) Date of Patent: Jul. 24, 2001

(54) LOWER REACTOR INTERNALS UP-ENDING DEVICE

(75) Inventors: Raman G. Patel, Pittsburgh; Robert E. Meuschke, Monroeville; Moshe A. Mahlab; David E. Boyle, both of Pittsburgh, all of PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/417,350

(22) Filed: Oct. 13, 1999

Related U.S. Application Data
(60) Provisional application No. 60/155,976, filed on Sep. 24, 1999.

(51) Int. Cl.[7] ............................. G21C 19/02; G21C 19/20
(52) U.S. Cl. .......................................................... 376/260
(58) Field of Search ..................................... 376/260, 268, 376/270

(56) References Cited

U.S. PATENT DOCUMENTS

| | | | |
|---|---|---|---|
| 4,778,645 | * 10/1988 | Altman et al. | 376/260 |
| 5,037,604 | * 8/1991 | Bauer et al. | 376/260 |
| 5,687,206 | * 11/1997 | Schmidt et al. | 376/260 |
| 5,712,887 | * 1/1998 | Thompson et al. | 376/260 |
| 5,970,109 | * 10/1999 | Meier-Hynek et al. | 376/260 |

* cited by examiner

*Primary Examiner*—Charles T. Jordan
*Assistant Examiner*—K. Kevin Mun

(57) ABSTRACT

An apparatus and method are provided for inverting the lower internal assembly of a nuclear reactor. The apparatus includes a frame which is sized to receive the lower internal assembly. The frame supports the lower internal assembly as it is being inverted. The apparatus also includes a spider assembly which fits within the lower internal assembly and provides support for a baffle assembly located therein. The method includes the steps of removing the lower internal assembly from a reactor vessel and rotating the lower internal assembly prior to performing maintenance.

10 Claims, 14 Drawing Sheets

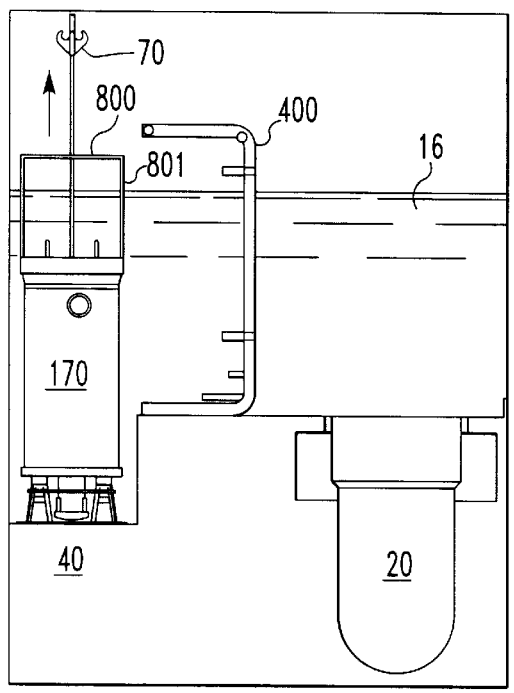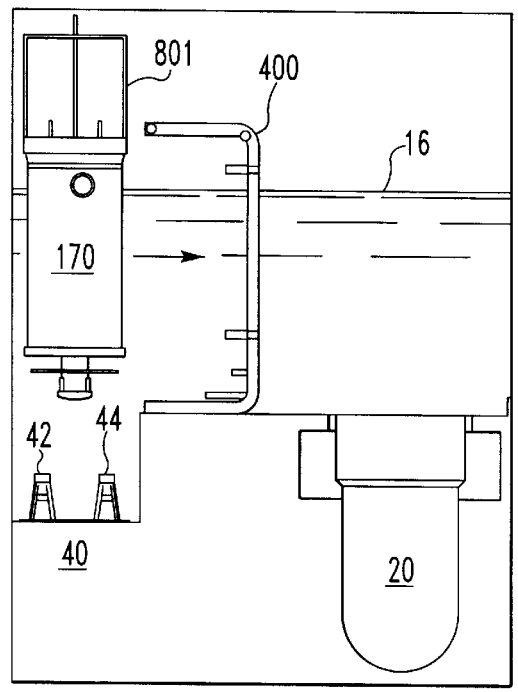
*FIG.11A*  *FIG.11B*
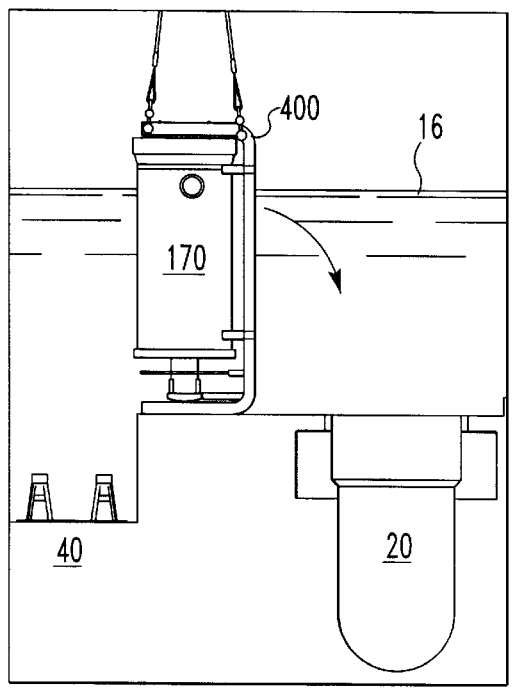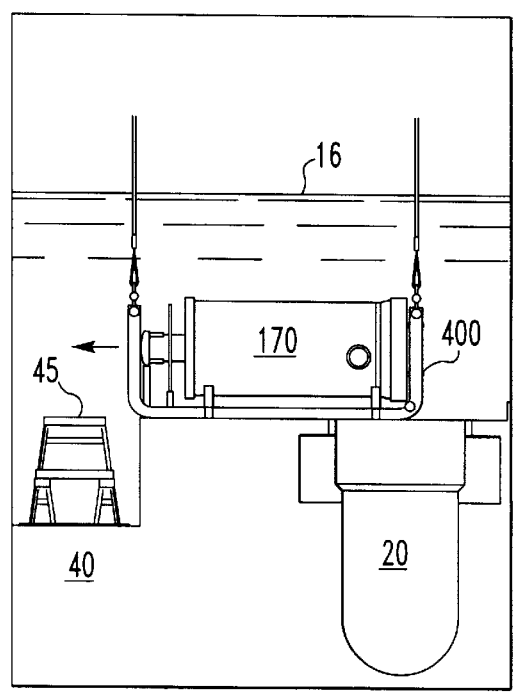
*FIG.11C*  *FIG.11D*

LOWER REACTOR INTERNALS UP-ENDING DEVICE

This Application claims the benefit of U.S. Provisional Application Ser. No. 60/155,976, filed Sep. 24, 1999.

BACKGROUND OF THE INVENTION

1. Field of the Invention

This invention relates to a method and apparatus to aid in the maintenance and repair of the lower internal assembly of a nuclear reactor vessel, and more specifically, to a method and apparatus which provides a frame capable of inverting the lower internal assembly so that repair and maintenance operations may be performed with greater speed, thus reducing the exposure of workers to radiation.

2. Background Information

Because of the radiation hazard present while performing repair and maintenance operations on the components of a nuclear reactor, it is desirable to limit the exposure of workers to any radioactive components during such maintenance and repair procedures. A nuclear reactor includes a stationary reactor vessel which encloses a removable reactor core assembly. The reactor core assembly includes two main assemblies, the upper internal assembly and the lower internal assembly. For example, the upper internal assembly includes the control rod drive mechanisms, control rod drive shafts and the upper core plate. The lower internal assembly includes the core barrel, lower instrumentation guide tubes, tie plates and a baffle. The nuclear fuel assemblies or fuel cells are maintained within the core barrel between the upper core plate and the lower core plate.

It is known in the prior art to perform maintenance operation on the lower internal assembly. Access to the lower internal assembly is gained by removing the reactor vessel upper head assembly and the upper internal assembly, including the upper core plate. This procedure exposes the fuel assemblies which are also removed. Once the upper internal assembly, which includes the upper core plate, and fuel assemblies have been removed, the lower internal assembly may be removed from the reactor vessel. When removed from the reactor vessel, the lower internal assembly is set on a storage stand which supports the lower internal assembly above the maintenance bay floor. While on the maintenance stand the lower end of the core barrel is approximately thirty feet under water.

Typically, the only procedure performed on the lower internal assembly is the inspection of the weld between the lower core forging and the core barrel. Should maintenance be required on elements of the lower internal assembly below the lower core forging, it would be necessary to construct a tool capable of being submerged thirty feet and turned at a 90-degree angle in order to access the lower internal assembly. Maintenance on the lower face of the lower core forging would require the instrument to have an additional 90-degree turn to access the lower side of the lower core forging. Maintenance procedures using such a tool would be time consuming and would expose workers to radiation throughout the period in which the tool was used. Such a high level exposure to radiation is not desirable.

Therefore, there is a need for a method and apparatus to allow workers to repair the lower internal assembly of a nuclear reactor core assembly which would reduce the amount of exposure to radiation.

SUMMARY OF THE INVENTION

These needs and others are satisfied by the invention which is directed to a method and apparatus for up-ending the lower internal assembly of a nuclear reactor so that the lower internal assembly and lower core forging may be directly accessed by maintenance and repair workers.

The apparatus for up-ending the core barrel and lower internal assembly includes a support which is capable of supporting the core barrel and lower internal assembly in the upright orientation, the horizontal orientation, and the inverted orientation. The apparatus includes a frame assembly having support brackets and support saddles for the core barrel. The apparatus further includes a spider assembly which is fitted within the core barrel and is used to support the internal baffle while the barrel is in the horizontal orientation. The apparatus allows workers to invert the lower internal assembly so that the lower core forging is positioned above the core barrel.

This invention further provides the method for inverting the lower internal assembly. The lower internal assembly is removed from the reactor vessel and placed on the storage stands as is known in the prior art. The spider assembly, which supports the baffle located within the core barrel, is then inserted in the lower internal assembly. The lower internal assembly may be lifted and inserted into the frame. Once the lower internal assembly is positioned within the frame, the frame is rotated ninety degrees before being inverted. Once the lower internal assembly is in the inverted orientation, the lower internal assembly is removed from the frame and positioned on the storage stand in the inverted position. Any maintenance on the lower face of the core forging or structures typically located below the lower core forging can now be performed with tools that directly access the lower internal assembly and lower core forging without the necessity of having such tools bent 90 degrees or more. Accordingly, maintenance and repair procedures can be performed more quickly with a reduced radiation exposure to the workers.

BRIEF DESCRIPTION OF THE DRAWINGS

A full understanding of the invention can be gained from the following description of the preferred embodiment when read in conjunction with the accompanying drawings in which:

FIG. 6A is a top view of a plunger assembly, FIG. 6B is a side view of a plunger assembly, and FIG. 6C is a top view of an alternate plunger head contour.

FIG. 7A is a side elevational view of the spider assembly with one baffle support plate assembly in place, FIG. 7B is a side view with two baffle support plate assemblies in place, FIG. 7C is a side view with three baffle support plate assemblies in place, FIG. 7D is a side view showing the complete spider assembly, and FIG. 7E is a detail of a support column foot.

FIG. 8A is a top view of the lifting plate assembly, FIG. 8B is a view showing the lifting coupling in the upright orientation, and FIG. 8C is a view of the lifting coupling in the inverted orientation.

FIG. 9A is a side elevational view of the frame, FIG. 9B is a cut-away front elevational view of the frame, FIG. 9C is a top view of the frame with the lifting plate assembly in place, FIG. 9D is a bottom view of the frame.

FIGS. 11A through 11H are schematic views of the up-ending procedure.

DESCRIPTION OF THE PREFERRED EMBODIMENT

Figure 1:
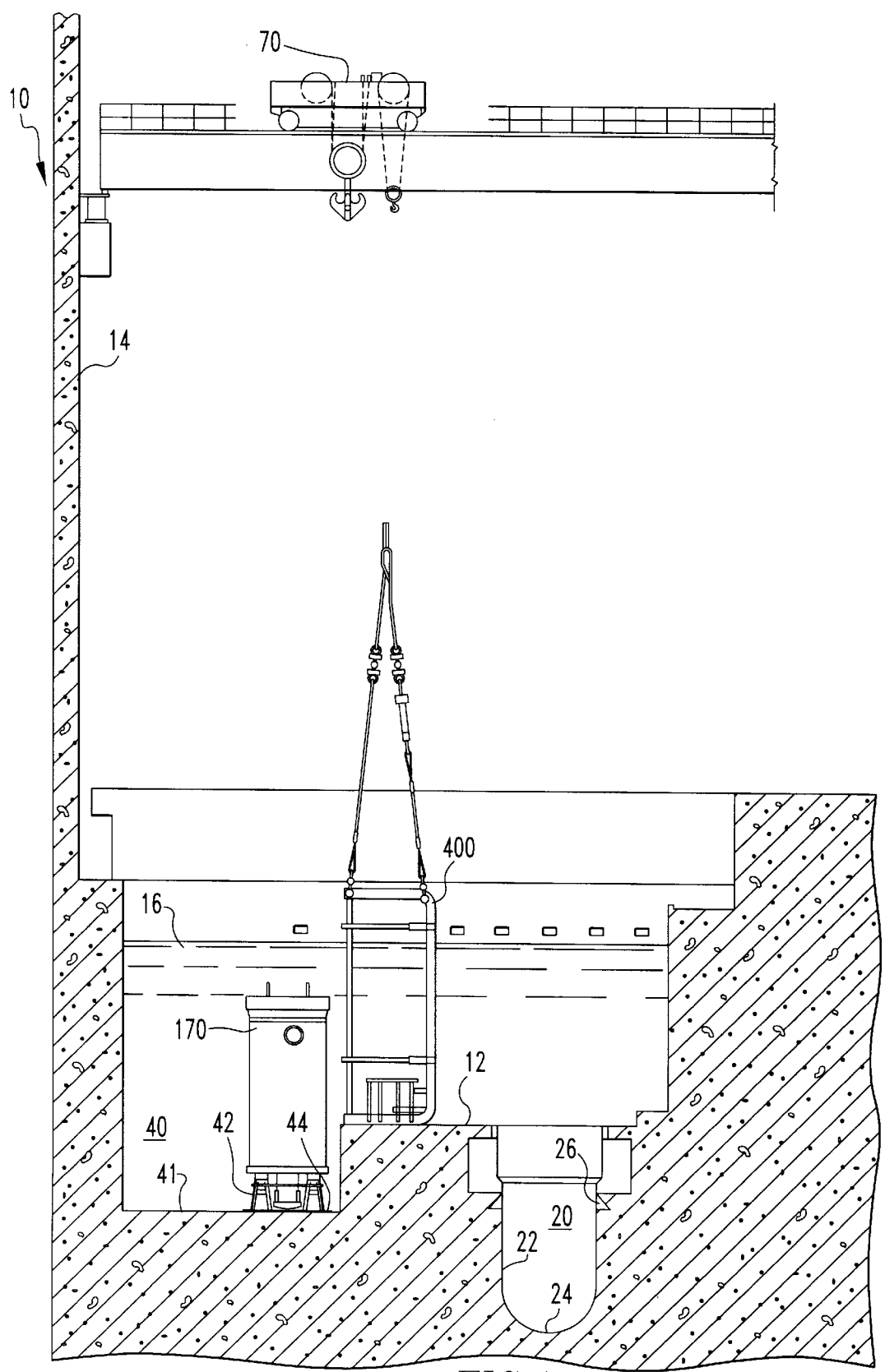
FIG. 1 is a partial cross sectional side elevational view of a nuclear reactor containment building.

FIG. 1 shows nuclear reactor containment building 10. The containment building 10 includes a floor 12, a plurality of walls 14 made from shielded concrete. The floor 12 is submerged under water 16 containing boric acid. The floor 12, includes a reactor vessel pit 20, and a maintenance bay 40. Both the reactor vessel pit 20 and the maintenance bay 40 are under water 16. The reactor vessel pit 20 has a generally cylindrical side wall 22 and a bottom surface 24. The side wall 22 includes a support means 26 to support a reactor vessel 100 (described below). Maintenance bay 40 includes work stands 42, 44. Maintenance bay 40 may have a floor 41 which is at a lower level than floor 12. Containment building 10 also includes a moveable polar crane 70 above water level 16. Polar crane 70 is moveable between a position above the reactor vessel pit 20 and the maintenance bay 40.

Typically, a reactor vessel 100 is disposed within the reactor vessel pit 20. As shown on FIG. 2, the reactor vessel 100 is cylindrical with a hemispherical bottom head 102, a cylindrical body 104, and a flanged removable upper head 106. A plurality of control rod drive mechanisms 107 are mounted on upper head 106. The drive mechanisms 107 are each coupled to a control rod drive shaft 108 which passes through openings 103 in upper head 106. Each control rod drive shaft supports a control rod cluster 109 which may be inserted or removed from the reactor core 220 (described below). The reactor pit bottom surface 24 may include hollow columns 200 which allow instrumentation 204 to pass therethrough. The reactor vessel body 104 has at least two openings 110, 112 which allow inlet nozzle 133 and outlet nozzle 134 (shown on FIG. 3) to pass therethrough. The reactor vessel 100 is supported by the support means 26 located in the reactor vessel pit 20. The support means 26 may include a ledge on the lower surface of openings 110, 112. Within the reactor vessel 100 is an upper internal assembly 120 and a lower internal assembly 170. The upper portion of the reactor vessel 100 forms a support ledge 101 which partially supports the upper and lower internal assemblies 120, 170.

The upper internal assembly 120 includes the top support plate 122, support columns 124, control rod guide tubes 126 and the upper core plate 128. The principal function of these structures are to align and locate the upper end of the fuel assemblies 222 (described below), and protect and guide control rod clusters 109 as they are inserted and removed from the reactor core 220.

Upper support plate 122 is generally cylindrical having a plurality of openings therethrough 123. A plurality of lower control rod guide tubes 142 are aligned with a portion of the plurality of openings 123 through the upper support plate 122. These lower guide tubes 142 are further aligned with the control rod drive shaft openings 103 passing through the upper head 106. Upper core plate 128 is generally cylindrical having a plurality of openings 129 therethrough. A portion of these openings 129 are aligned with the openings 123 in the upper support plate 122 and allow control rod clusters 109 to be inserted and removed from the reactor core 220. Other openings 129 allow water to pass through the upper core plate 128.

Figure 2:
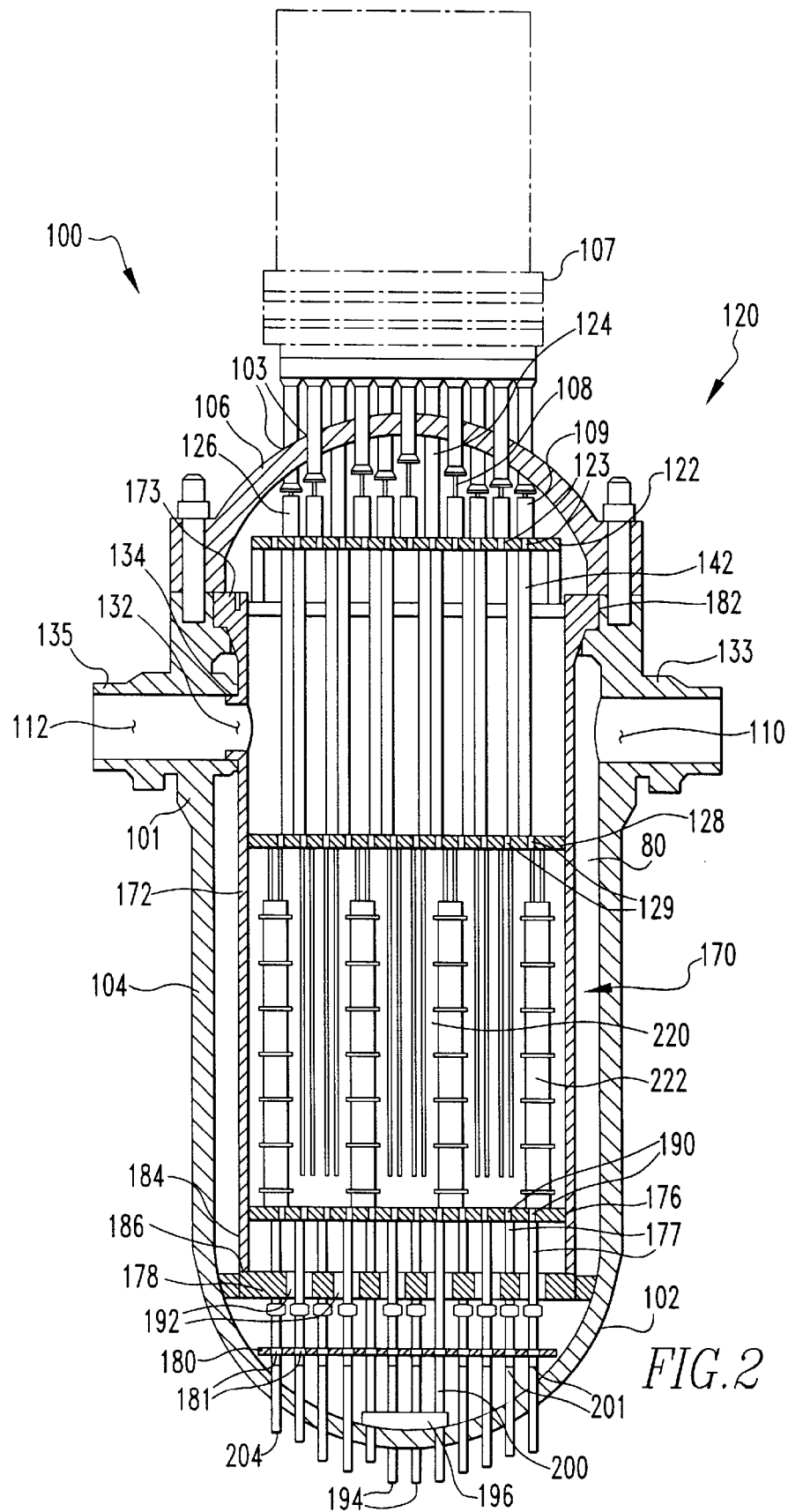
FIG. 2 is a cross sectional side elevational view of a nuclear reactor vessel.
Figure 3:
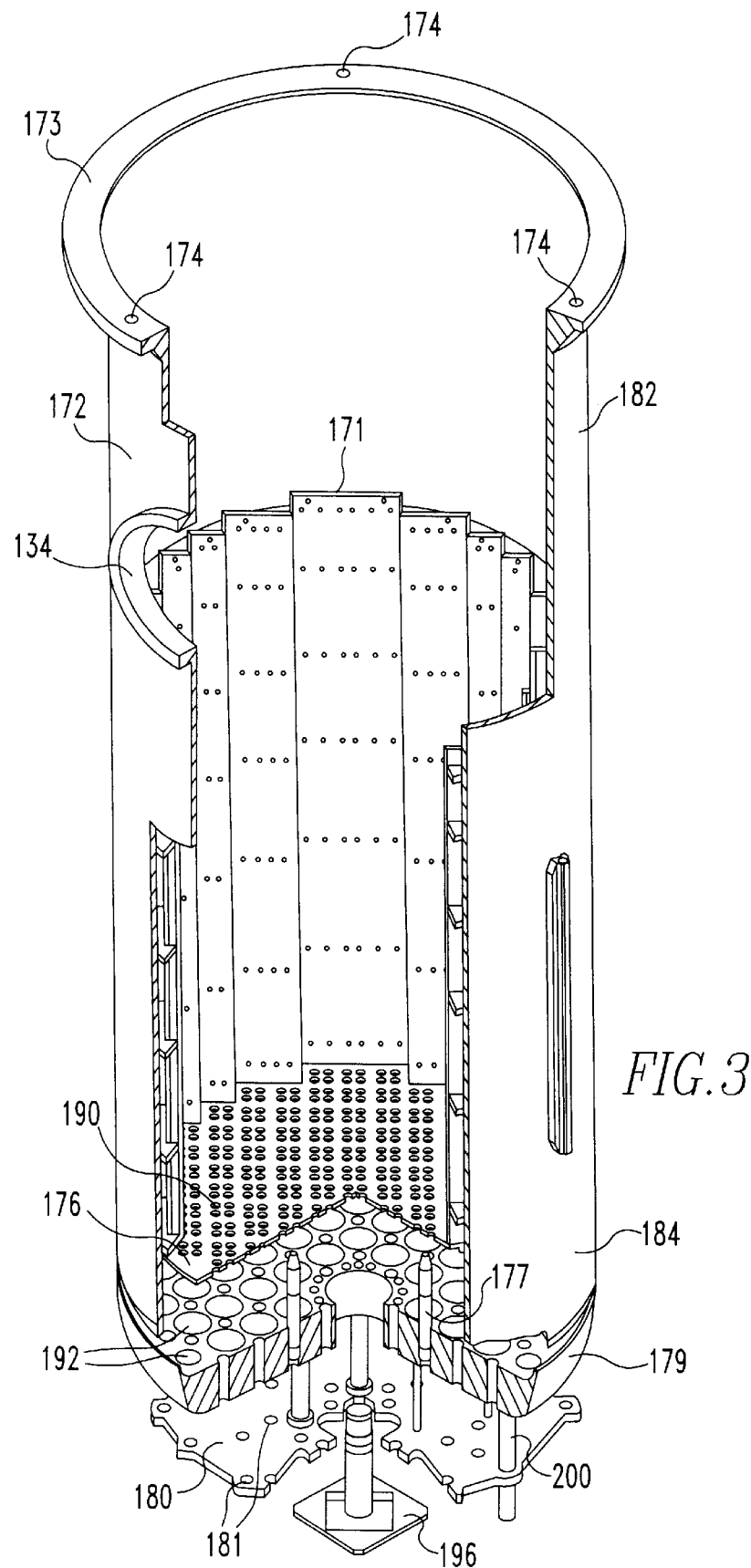
FIG. 3 is a cut-away perspective view of the lower internal assembly.

As shown in FIGS. 2 and 3, the lower internal assembly 170 includes the core barrel 172, a baffle assembly 171 (shown in FIG. 3), the lower core plate 176, the core support forging 179, a tie plate assembly 180, energy absorbers 194 and a secondary core support 196. The core barrel 172 has an upper end 182 and a lower end 184. As shown in FIG. 2, the core barrel 172 includes one or more outlet ports 132 (only one outlet port is shown) which are each coupled to an outlet nozzle 134. Outlet nozzle 134 is in fluid communication with outlet pipe 135 which communicates with a steam generating vessel (not shown). The upper end 182 of the core barrel 172 includes a flange 173 extending perpendicularly outwardly from the core barrel 172. The flange 173 rests on the internal support ledge 101 of the reactor vessel 100. The core barrel flange 173 has a plurality of threaded openings 174. In the preferred embodiment there are three threaded openings 174. The core barrel lower end 184 includes a radial support 186 which is coupled with the lower core support forging 179. The lower core barrel radial support 186 may be welded to the lower core support forging 179. The core barrel 172 is spaced apart from the reactor vessel 100, forming a plenum 80 therebetween.

The lower core plate 176 is generally cylindrical and includes a plurality of openings 190. The lower core plate 176 is spaced above the core support forging 179. Baffle assembly 171 is disposed between upper core plate 128 and lower core plate 176. As shown on FIG. 4, the baffle assembly 171 has a perimeter comprised of flat surfaces connected at 90° angles extending within the cylindrical perimeter of core barrel 172.

Lower core support forging 179 is disposed below the lower core plate 176. A plurality of lower core plate columns 177 extend upwardly from the lower core support forging 179, supporting the lower core plate 176. The core support forging 179 also includes a plurality of openings 192 which are aligned with the openings 190 in the lower core plate 176. The core support forging 179 is supported by the core support columns 200 which extend downwardly therefrom and pass through the lower head 102 of the reactor vessel 100. Each core support column 200 includes a coupling 201 to attach the support column to the lower core support forging 179. The core support columns 200 are stabilized by a tie plate assembly 180. The tie plate assembly 180 is generally circular and includes a plurality of openings 181 to allow support columns 200 to pass therethrough. A portion of the core support columns 200 are coupled with a secondary core support 196. The secondary core support 196 is a disk having an arcuate bottom surface which is adapted to match the curvature of the reactor vessel 100. The core support columns 200 are hollow and enclose instrumentation 204. The instrumentation 204 extends through support means 26 and columns 200 from the outer side of the reactor vessel 100 through the lower head 102 and through core support forging 179. The instrumentation 204 is further extended through lower core plate support columns 177 and through lower core plate 176 and extending into the reactor core 220.

The nuclear fuel cells 222 are disposed within the core barrel lower portion 176 between the upper core plate 128 and the lower core plate 176 and within the baffle assembly 171. This area is the reactor core 220. A plurality of control rod clusters 109 may be inserted in or removed from the reactor core 220 as required using the control rod drive shaft 108.

In operation, water passes through an inlet nozzle 133 into the plenum 80 between the reactor vessel 100 and the core barrel 172. The water is drawn downwards towards the lower end of the reactor vessel 100. As the water passes below the lower core support forging 179 it is drawn upwards through the openings 190, 192 in the lower core forging and lower core plate. The water passes into the reactor core 220 where it is heated by the fuel cells 222. The heated water rises through the reactor core 220 and passes through the plurality of openings in the upper core plate 129. The heated water then exits the reactor vessel 100 through the outlet nozzle 134.

Maintenance of the upper internal assembly 120 is well known in the prior art. To reach the upper internal assembly 120, the upper head 106 of the reactor vessel 100 and associated components are removed. The upper internal assembly 120 can also be removed. With the upper internal assembly 120 removed, the fuel cells 222 may be removed from the reactor core 220. (As shown in FIGS. 3 and 4) When this operation is complete, only the lower internal assembly 170, as shown in FIG. 3, remains within the reactor vessel 100.

FIGS. 5–9 show an up-ending device according to the present invention. The up-ending device allows the removal of the lower internal assembly 170 from the reactor vessel 100 so that the lower internal assembly 170 may be inverted for maintenance operations. The up-ending device includes a frame assembly 400 (shown in FIGS. 9A–9E) and a spider assembly 500 (shown in FIG. 7D). The spider assembly 500 is, generally, fitted within the core barrel 172 and baffle assembly 171 to support the baffle assembly 171 and core barrel lower portion 172 during the up-ending procedure. The frame 400 is fitted about the core barrel 172 and is attached to the overhead polar crane 70.

As shown in FIGS. 7A–7D, the spider assembly 500 includes a central column 510 and at least one baffle support plate assembly 520. In the preferred embodiment, there are three baffle support plate assemblies 520, 522, 524. Central column 510 includes a means to support baffle support plate assemblies 520, 522, 524. In the preferred embodiment the support means is a first, second and third set of intermittent partial flanges 516, 517, 518. The first set of intermittent partial flanges 516 is located on the lower portion of central column 510. A second set of intermittent partial flanges 517 is located on the medial portion of central column 510. The third set of intermittent partial flanges 518 is located at the top of central column 510. Spider assembly central column 510 includes a plurality of lower projections 512 which are sized to engage lower core plate openings 190. The spider assembly central column 510 further includes a lifting bale 514 located at its upper end.

Figure 4:
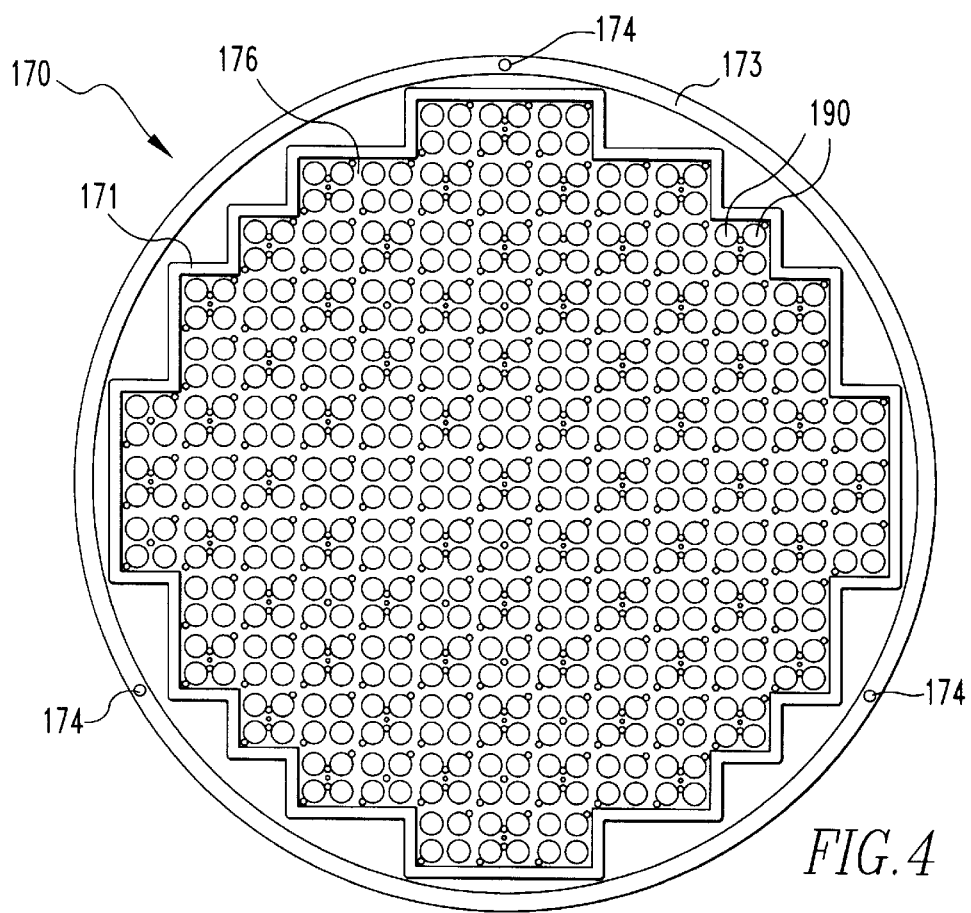
FIG. 4 is a top view of the lower internal assembly.

As shown on FIG. 4, the baffle assembly 171 has a perimeter comprised of flat surfaces connected at 90° angles extending within the cylindrical perimeter of the core barrel lower portion 172. The baffle support plate assemblies 520, 522, 524 are shaped to fit within the jagged perimeter of the baffle assembly 171, that is, the baffle support plate assemblies 520, 522, 524 have the same cross-sectional shape as the baffle assembly 171. The baffle support plate assemblies 520, 522, 524 further include a medial hole 526 which is sized to fit around a spider assembly central column 510.

Each baffle support plate assembly 520, 522, 524 includes a plurality of lifting rings 527 which may be coupled with a lifting device, such as crane 70. The baffle support plate assemblies 520, 522, 524 further include a plurality of plunger assemblies 530 mounted adjacent to the outer perimeter of the baffle support plates 520, 522, 524. The plunger assemblies 530 act as an engaging means to secure the baffle assembly 171.

Figure 5:
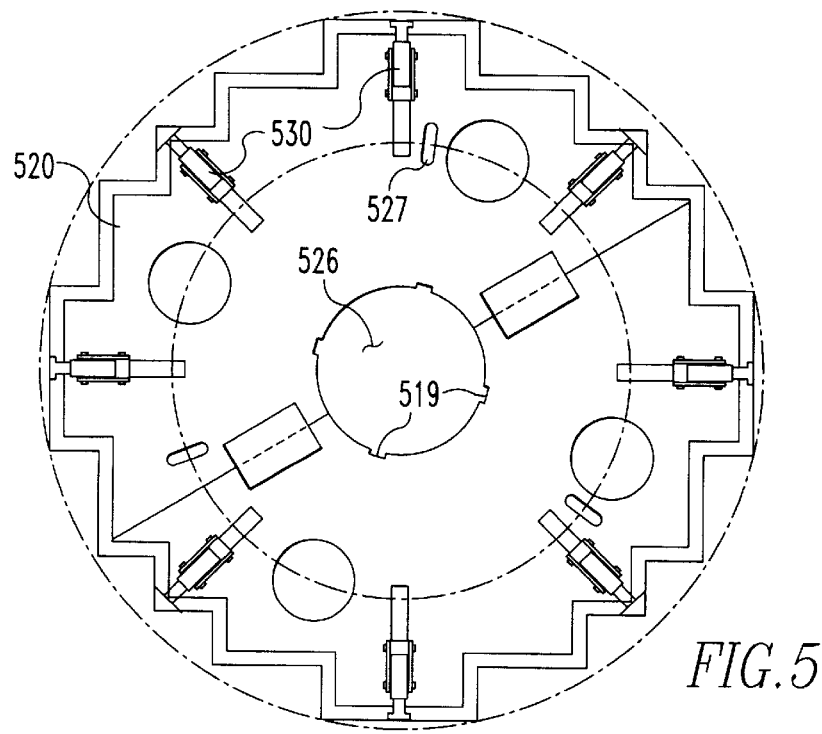
FIG. 5 is a top view of a spider assembly baffle support plate assembly.
Figure 6A:
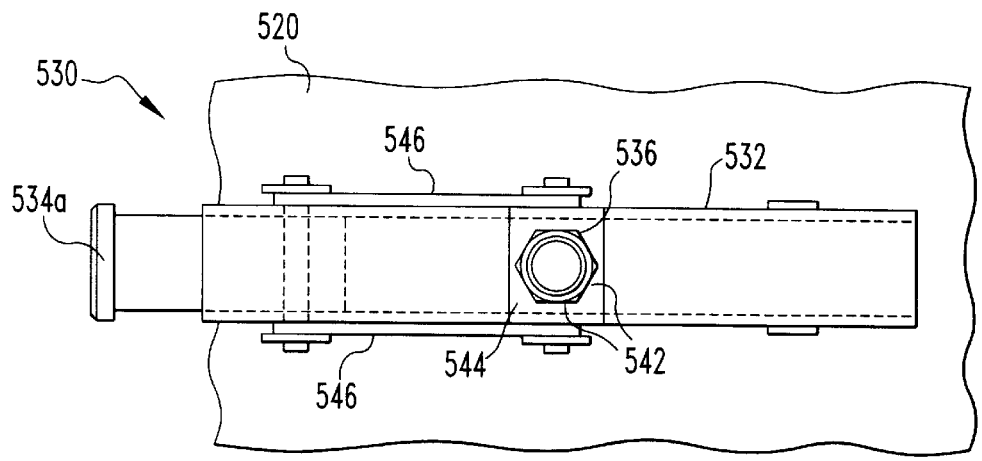
FIGS. 6A–6C are views of a spider plunger assembly, more specifically.
Figure 6B:
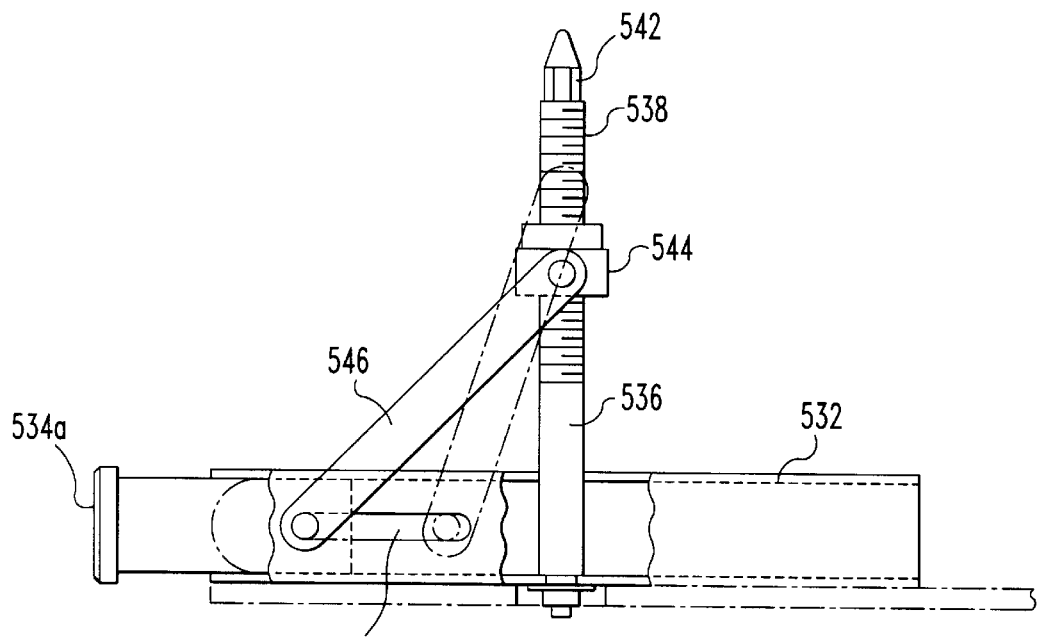
Figure 6C:
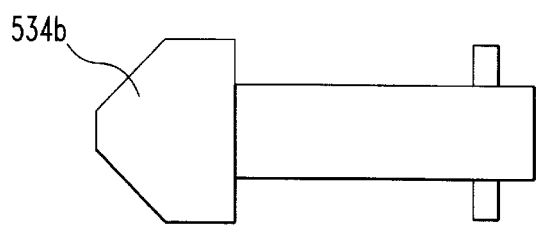

As shown in FIGS. 6A and 6B, the plunger assembly includes a horizontal hollow tubular member 532 attached to a baffle support plate 520, 522, 524. A plunger head 534a is disposed within the hollow tubular member 532. The hollow tubular member 532 further includes an elongated opening slot 533 on at least one side, preferably on two sides adjacent to the plunger head 534a. A rotatable vertical member 536 extends upwardly at a generally 90° angle from a baffle support plate 520 and through tubular member 532. The top of vertical member 536 include a plurality of flat surfaces 542, which may be coupled to a plunger engaging tool 501 (shown in FIG. 7A). The vertical member 536 includes an upper threaded portion 538. A collar 544 having a threaded inner surface is disposed on vertical member 536 engaging threaded portion 538. Collar 544 is coupled to one end of a diagonal member 546. The diagonal member 546 is coupled at the other end to plunger head 534a through opening 533. In operation, as vertical member 536 is rotated, collar 544 moves vertically causing the lower end of diagonal member 546 to move plunger head 534a horizontally. As the plunger head 534a is moved horizontally, it may be biased against baffle assembly 171. The plunger head 534a may be flat, as shown on FIGS. 6A and 6B, or may be contoured, as shown on FIG. 6C. As shown on FIG. 5, the plungers 530 are preferably evenly disposed about baffle support plates 520, 522, 524. Plungers 530 which are disposed adjacent to flat sides of the baffle assembly 171 will have a flat head 534a. A plunger 530 disposed adjacent to corners of baffle assembly 171 and will have contoured heads 534b.

Figure 7A:
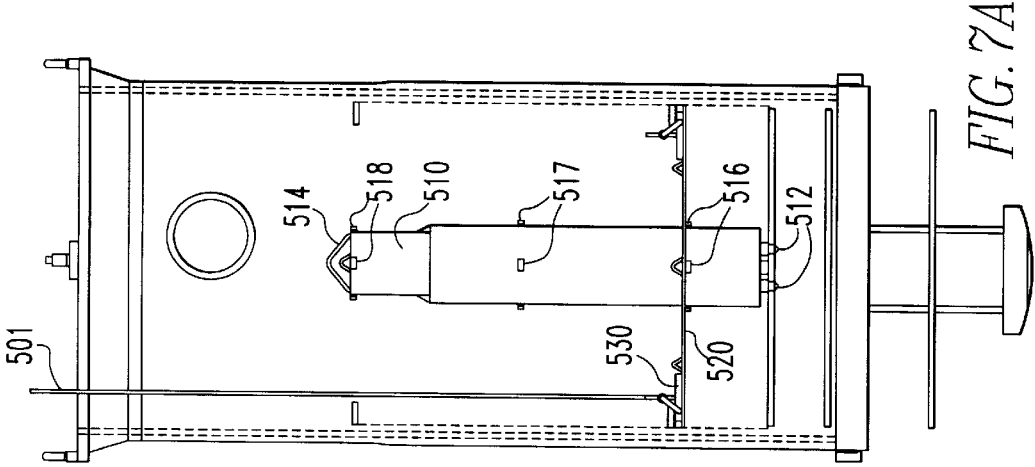
FIGS. 7A–7E are side elevational views of the spider assembly installed in the lower internal assembly. More specifically.
Figure 7B:
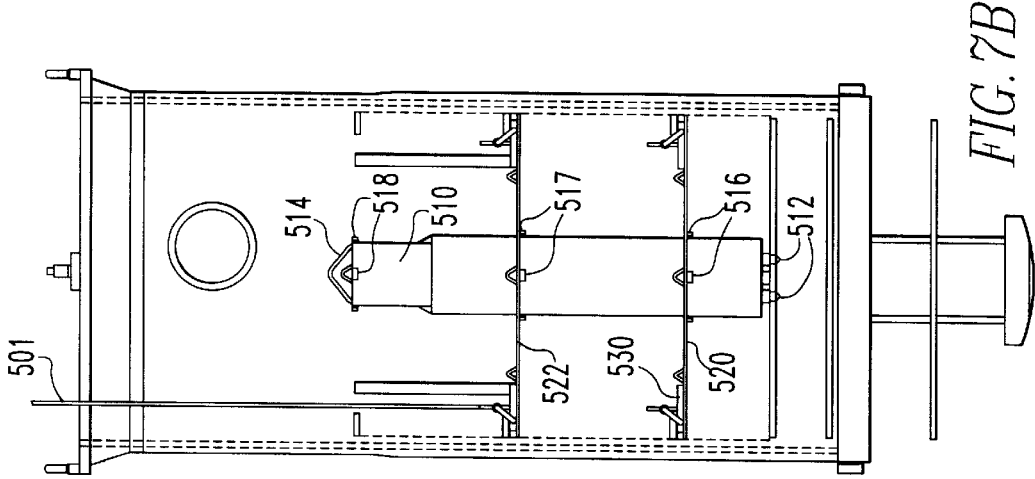
Figure 7C:
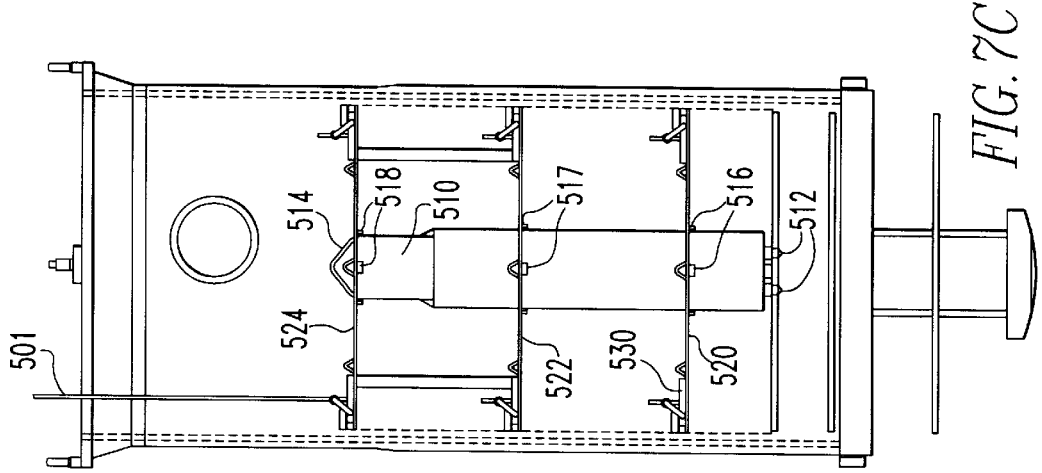

As shown in FIGS. 7A–7D, the spider assembly 500 is installed by attaching the lowest baffle support plate assembly 520 to central column 510. Central column 510 is passed through the medial opening on baffle support plate assembly 520, and the baffle support plate assembly 520 is lowered until it rests upon partial flange 516. Cutouts 519, as shown in FIG. 5, allow baffle support plate 520 to pass over partial flanges 517, 518. Using polar crane 70 attached to lifting bale 514, central column 510 and baffle support plate assembly 520 is inserted in the lower internal assembly 170. The central column 510 is lowered until lower projections 512 are mounted within lower core plate openings 190. Once the column 510 and the first baffle support plate 520 are positioned, the plurality of plunger assemblies 530 on are engaged the first baffle support plate 520 by rotating each vertical member 536 until each plunger head 534a, 534b engages baffle assembly 171. As shown in FIG. 7B a second tier baffle support plate 522 is then lowered into place until positioned on the second set of partial flanges 517 in the medial portion of spider assembly central column 510. The baffle support plate assembly 522 may be coupled to the overhead crane 70 by lifting rings 527. Again, once the baffle support plate assembly 522 is positioned, plunger assemblies 530 are engaged with the baffle assembly 171. As shown in FIG. 7C, baffle support plate assembly support columns 560 may be installed on the second tier baffle support plate assembly 522 to support the third tier baffle support plate assembly 524. The third tier baffle support plate assembly 524 is then lowered into the lower internal assembly 170 until the third tier baffle support plate assembly 524 is generally aligned with the top of spider assembly central column 510. Third tier baffle support plate assembly 520 rests upon partial flange 518 located at the top of the spider assembly central column 510. Again, the plunger assemblies 530 are engaged to secure the baffle assembly 171.

Figure 7D:
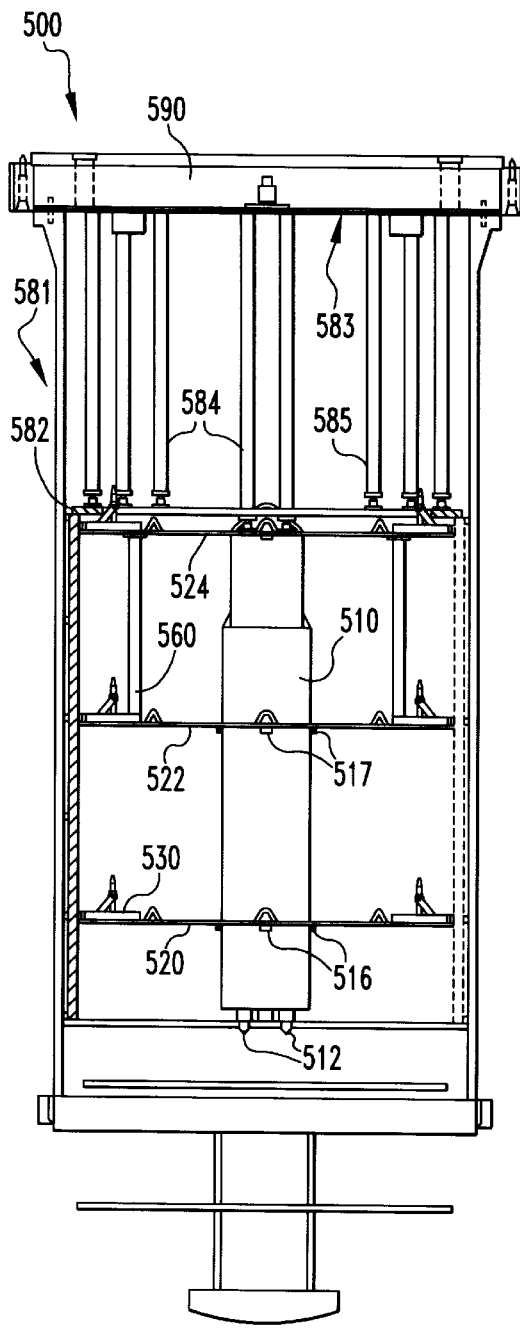
Figure 7E:
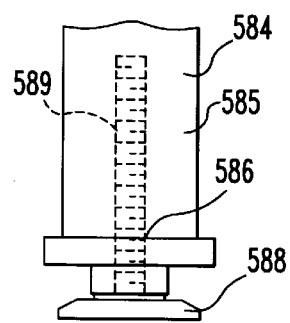
Figure 8B:
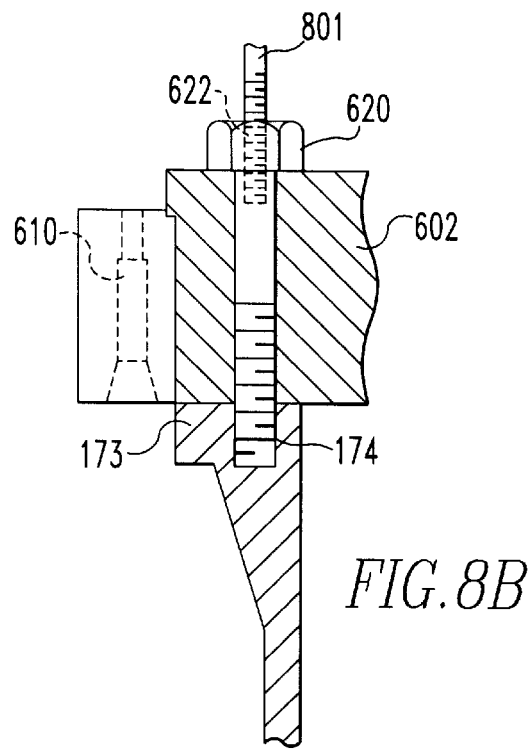
Figure 8C:
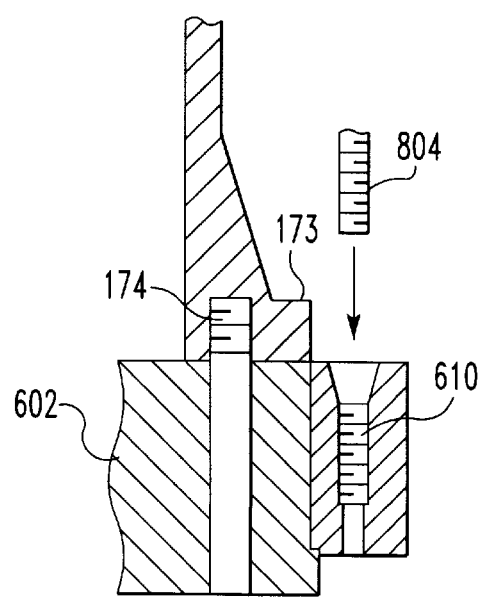

As shown on FIG. 7D the spider assembly further includes an upper brace assembly 581 which includes a lower baffle support ring 582, a plurality of hollow support columns 584 and an upper lifting plate assembly 590. Hollow columns 584 are disposed below lifting plate assembly 590. Ring 582 rests upon the upper edge of baffle assembly 171. As shown in FIG. 7E, the support columns 584 each have a lower end 585 which includes a threaded opening 586. A height adjustment means, such as a floatable pad 588 coupled to a threaded rod 589, is disposed within threaded opening 586. The support columns 584 are coupled to the lower side 583 of upper lifting plate assembly 590 and are aligned with ring 582.

Figure 8A:
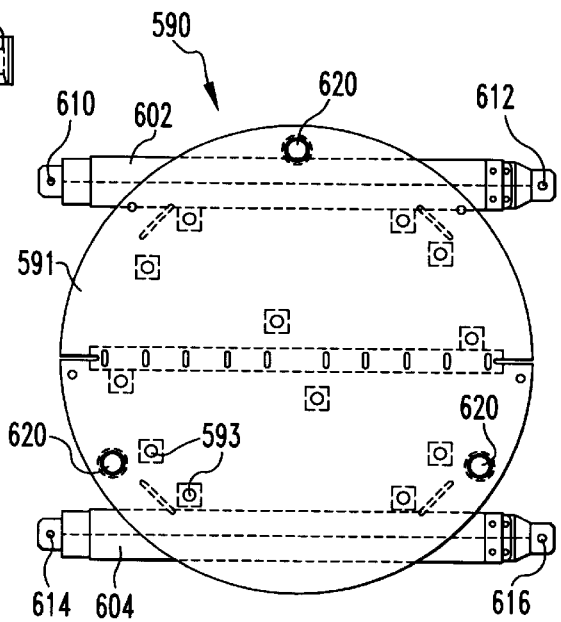
FIGS. 8A–8C are views of the lifting plate. More specifically.

As shown in FIG. 8A lifting plate assembly 590 includes a generally circular planar disk 591 having a diameter approximately equal to the core barrel upper flange 173. Disk 591 includes openings 593 which are aligned with hollow support columns 584. Openings 593 allow access to the interior of the support columns 584 so that a tool may be inserted to rotate threaded rod 589, thereby biasing pad 588 against ring 582. When lifting plate assembly 590 is lowered onto the lower internal assembly 170, the lower end of the support columns are adjacent to ring 582. Lifting plate assembly 590 further includes two parallel cross bars 602, 604 disposed on disk lower surface 583. Cross bars 602, 604 include a plurality of threaded harness holes 610, 612, 614, 616, one each located at each end of the cross bars 602, 604. When the lifting plate assembly 590 is installed, only cross bars 602, 604 contact core barrel upper flange 173. Thus, reducing the possibility of damaging the flange surface.

Lifting plate assembly 590 further includes an attaching means and a lifting harness attachment means 620. The preferred embodiment of the attaching means and the lifting harness attachment means 620 are a plurality of threaded fasteners 620 which extend through disk 591. In the most preferred embodiment, there are three fasteners which are threaded into lower internal assembly flange threaded openings 174 (shown on FIG. 3). By installing the threaded fasteners through the lifting plate assembly 590, the lifting plate assembly 590 is attached to the lower internal assembly 170. The threaded fasteners 620 are coupleable to a lifting harness. The fasteners may have, for example, threaded bore holes 620 which a harness 800 (described below) may engage.

Thus, when installed the spider assembly 500 supplies a radial force, through plungers 530, to baffle assembly 171 as well as a compressive force, through ring 582. Additionally, lifting plate assembly 590 provides a secure attachment to the lower internal assembly 170.

Figure 9A:
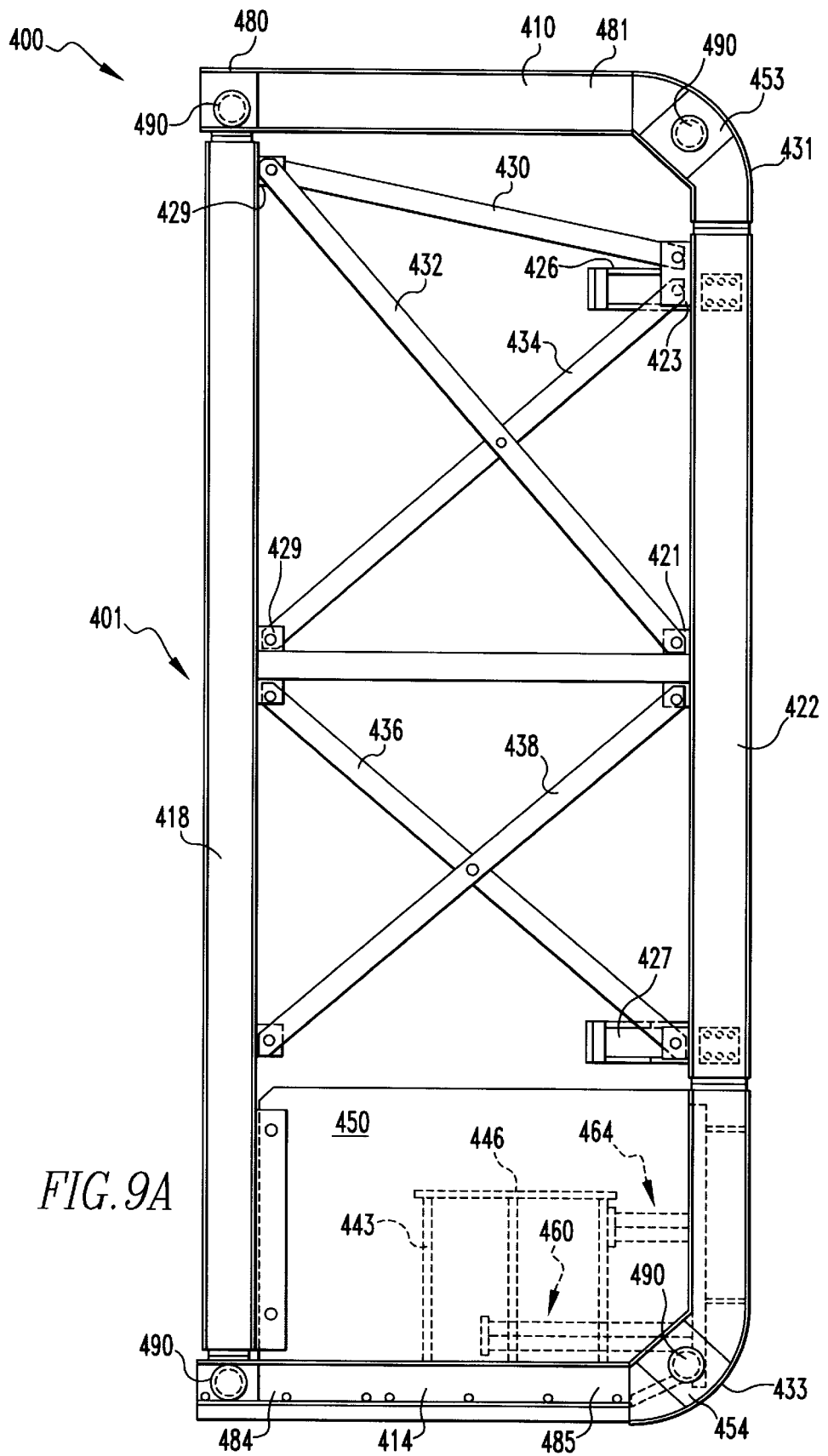
FIGS. 9A–9D are views of the frame. More specifically.
Figure 9B:
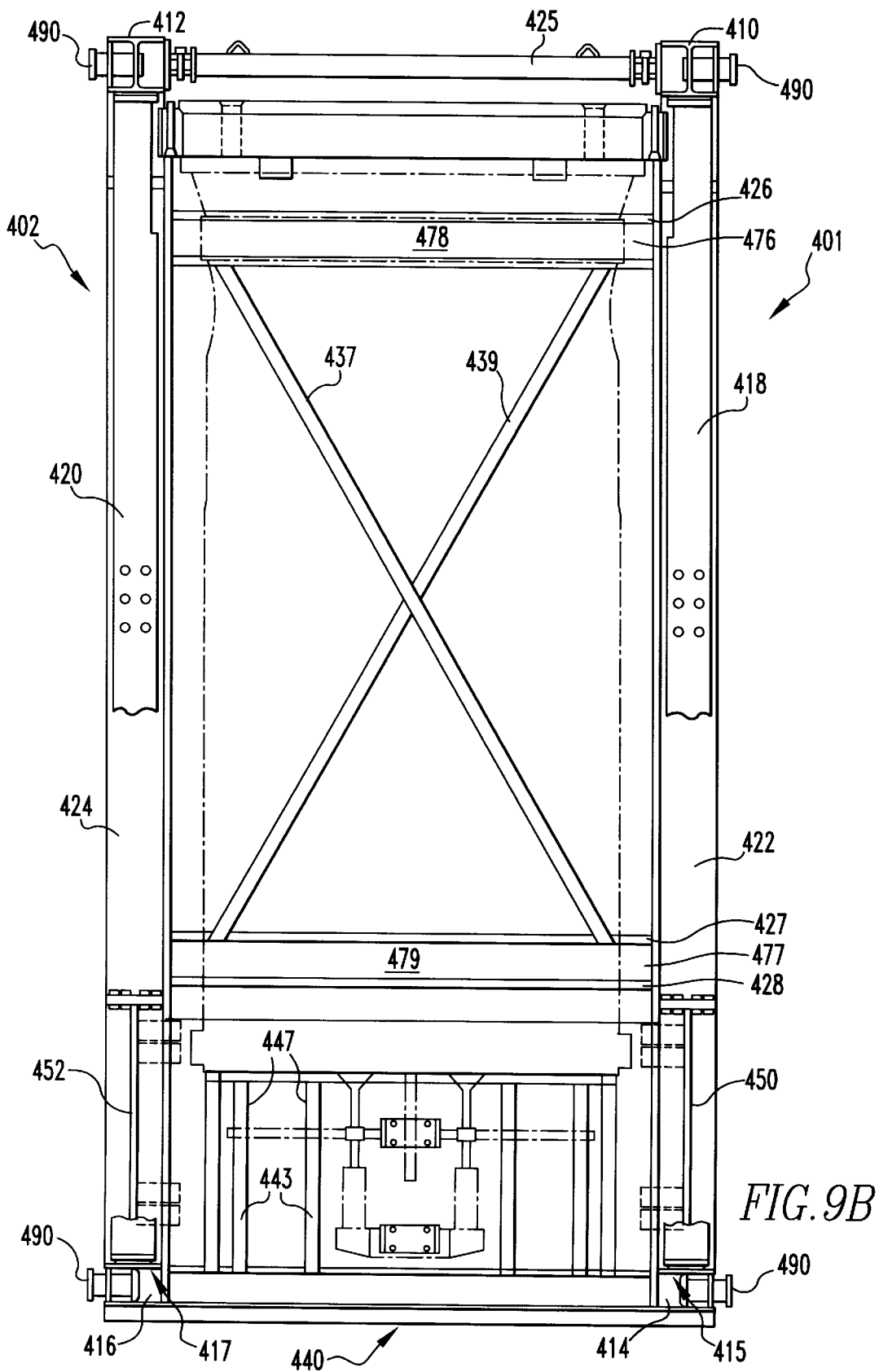

As shown on FIGS. 9A–9E, the frame assembly 400 has two mirror image sides 401, 402 (Side 401 is shown in FIG. 9A) which are spaced apart by cross braces 425, 426, 427, 428 (shown in FIG. 9B). Accordingly, it is understood that certain members, e.g. braces 430, 432 (shown in FIG. 9A) on side 401, have unseen counterparts on side 402. The frame assembly 400 includes first members 410, 412, second members 414, 416, front members 418, 420 and rear members 422, 424. There are additionally cross braces 430, 432, 434, 436 and 438. Lower plate assembly 440 (shown in FIG. 9B) is disposed between second members 414, 416. Shielding plates 450, 452 are disposed adjacent to second members 414, 416. The frame 400 further includes secondary core support saddle 460, tie plate assembly support saddle 464 and core barrel support saddles 476, 477.

As shown on FIG. 9A, side 401 (which is mirrored, but not shown on side 402) of the frame 400 is generally rectangular and includes a first member 410 which has a front end 480 and a rear end 481. First member rear end 481 is coupled to one end of end of rear member 422 at a 90° angle. First member front end 480 is coupled to one end of end of front member 418 at a 90° angle. Second member 414 has a front end 484 and a rear end 485. The ends of front member 418 and rear member 422 opposite the connection with first member 410 are coupled to second member 414. Second member rear end 485 is coupled to one end of rear member 422 at a 90° angle. Second member front end 484 is coupled to one end of end of front member 418 at a 90° angle.

Each end of rear member 422 includes an arcuate corner portions 453, 454 which each have a outer surface 431, 433. As will be described below, the frame assembly is rotated on outer surfaces, 431, 433. Front member 418 and rear member 422 are also connected by a plurality of braces 430, 432, 434, 436, 438 which are connected to tabs 429 on the front member 418 and tabs 421 on the rear member 422. As shown on FIG. 9B, cross braces 437, 439 are disposed between rear members 422, 424.

Figure 9C:
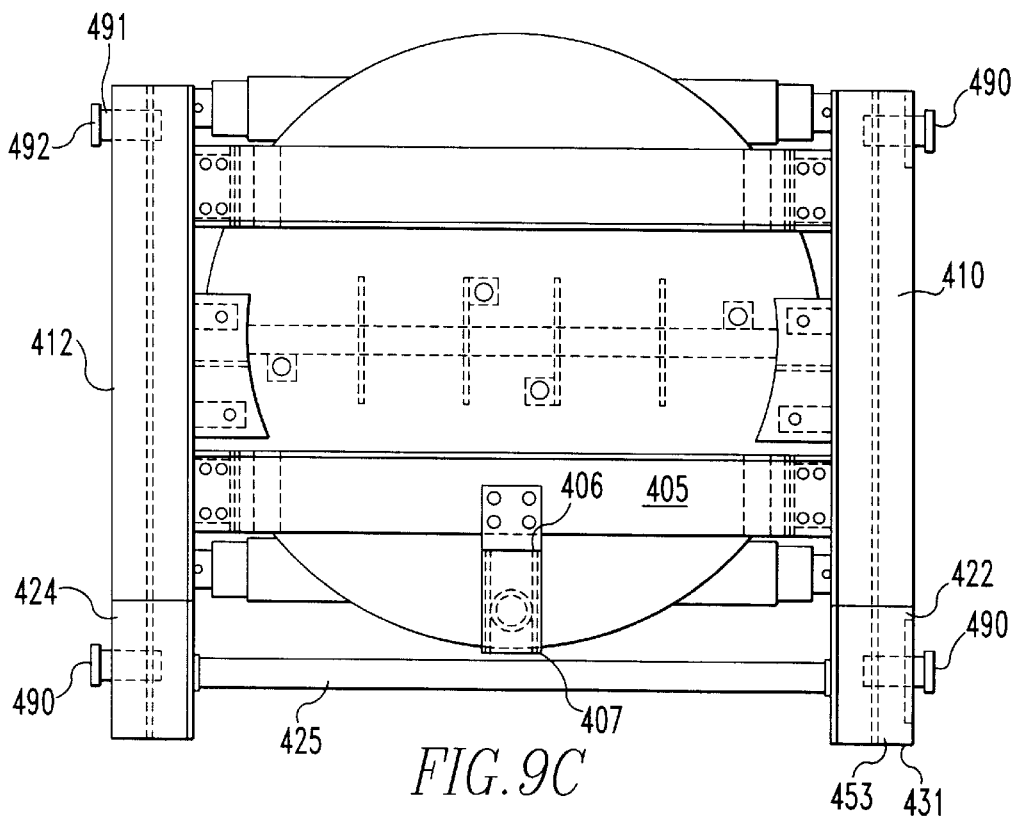
Figure 9D:
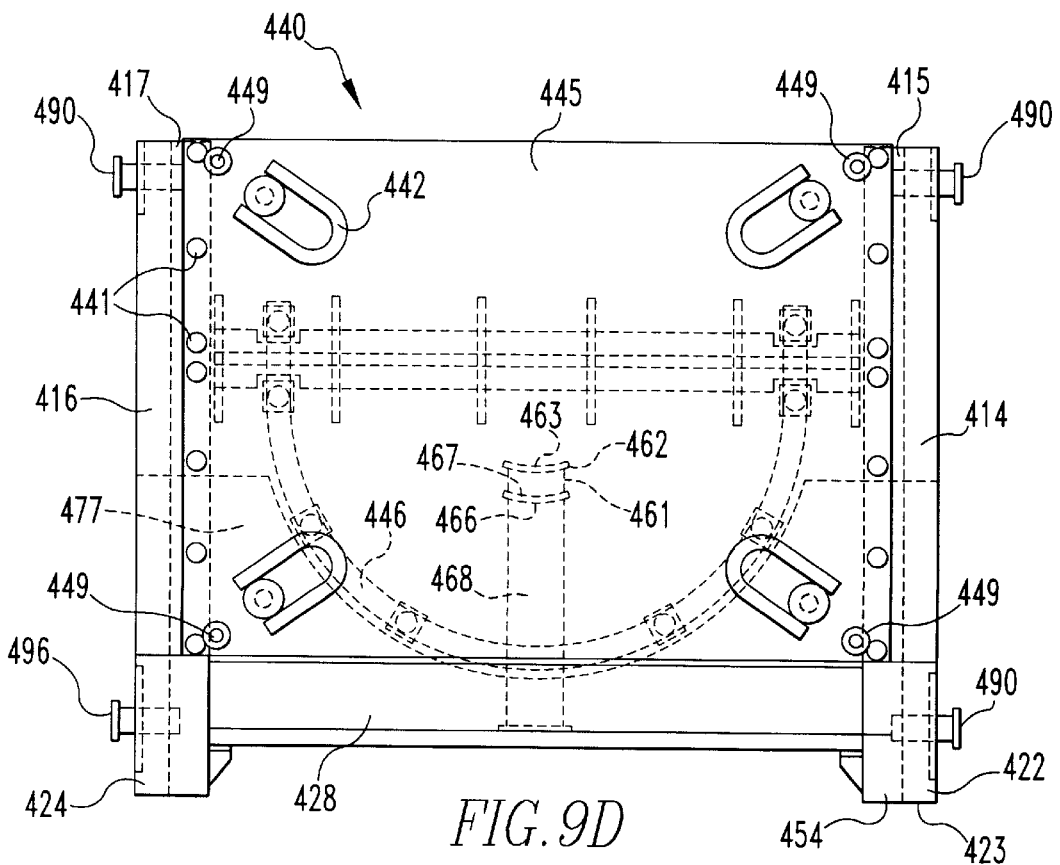
Figure 10:
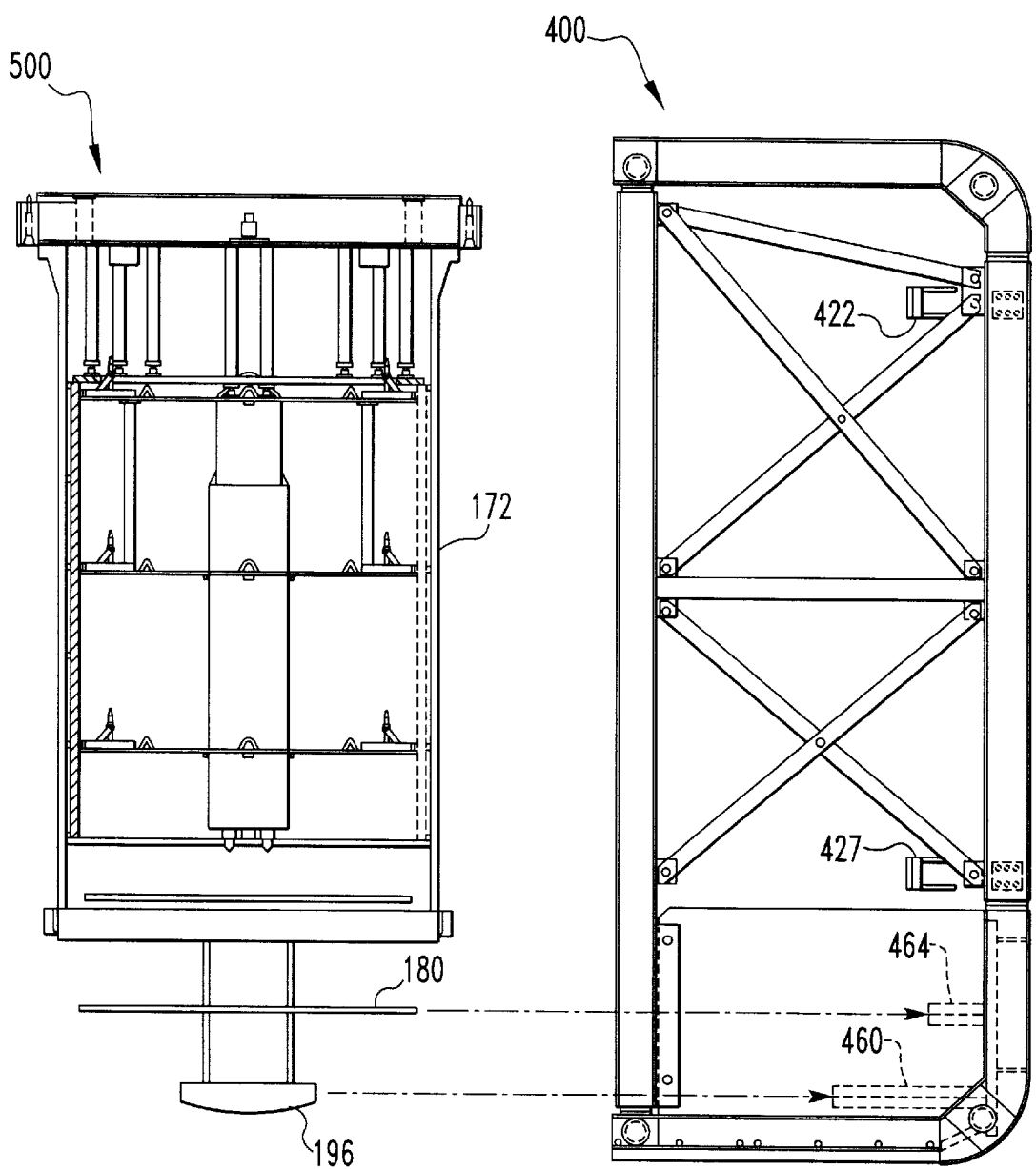
FIG. 10 is a side elevational view of the lower internal structure adjacent to the frame.

As shown on FIGS. 9B–9D, sides 401, 402 are spaced apart by braces 425, 426, 427, 428. Brace 425 is disposed between sides 401, 402 adjacent to rear members 422, 424 upper rounded corner 453. Braces 426 and 427 are disposed between sides 401, 402 spaced along the medial portion of rear members 422, 424. Brace 428 is disposed between sides 401, 402 at rear member lower rounded corner 433.

In the preferred embodiment, frame assembly second members 414, 416 are I-beams having an upper flange 415, 417. The I-beam upper flange 415, 417 is above the bottom surface of second members 414, 416. Each upper flange 415, 417 has a plurality of threaded fastener holes (not shown). Detachable frame lower plate assembly includes a planar member 445. Frame lower plate planar member 445 is attached by fasteners 441 to upper flange 415, 417. Frame lower plate assembly 440 further includes lifting rings 442 disposed on the outer surface of frame lower plate planar member 445. Frame lower plate assembly lifting rings 442 may be coupled to a lifting means such as crane 70. As shown on FIG. 9B, a plurality of lower internal assembly support columns 443 extend upwardly from the interior surface of frame lower plate planar member 445 terminating in distal ends 447. A lower internal assembly support arc 446 is disposed at the distal ends of the plurality of lower internal assembly support columns 443.

As shown on FIG. 9B, core barrel saddles 476, 477 are disposed between rear members 422, 424 adjacent to braces 426, 427. In the preferred embodiment, core barrel saddle 476 is integral to brace 426 and core barrel saddle 477 is integral to brace 427. As shown on FIG. 9D, each core barrel saddles 476, 477 includes an upper arcuate surface 478, 479 which is sized to fit the outer diameter of core barrel 172. Tie plate assembly support saddle 464 includes a support member 465 and a saddle pad 466. Saddle pad 466 includes an arcuate surface 467 which has a curvature matching that of tie plate assembly 180. Secondary core support saddle 460 includes a support member 461 and a secondary core support saddle 462. Secondary core support saddle 462 also includes an arcuate surface 463 which is sized to match the curvature of the secondary core support 196. When the lower internal assembly 170 is installed within Frame 400, secondary core support 196 is adjacent to secondary core support saddle 460. Tie plate assembly 180 is adjacent to tie plate assembly support saddle 464. Core barrel 172 is adjacent to core barrel saddles 476, 477. When the up-ender device is laid horizontally each of these components will rest upon the respective support saddles.

Lifting lugs 490 are located at each corner of sides 401, 402. As shown on FIG. 9C, each lifting lug 490 includes a cylindrical base 491 and an outer disk 492. The outer disk 492 has a larger diameter than the cylindrical base 491.

In operation, the lower internal assembly 170 fits within sides 401, 402 of frame assembly 400. In the upright orientation, the lower core support forging 179 rests upon lower internal assembly support arc 446. L-shaped retainer 406 prevents the lower internal assembly 170 from tipping out of frame 400. Crane 70 is connected to lifting lugs 490 and is used to rotate the frame 400. When in the horizontal orientation, core barrel saddles 476, 477, tie plate assembly support saddle 464, and secondary core support saddle 460 support the lower internal assembly 170. When in the inverted upright orientation the lower internal assembly 170 rests upon lifting plate assembly 590.

Figure 11E:
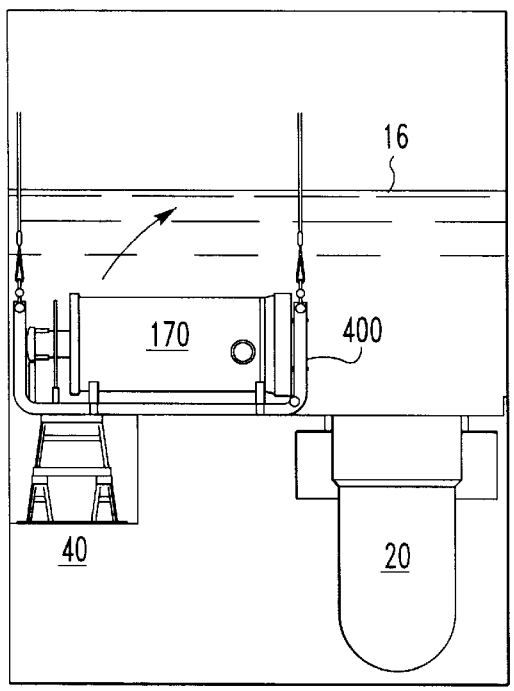
Figure 11F:
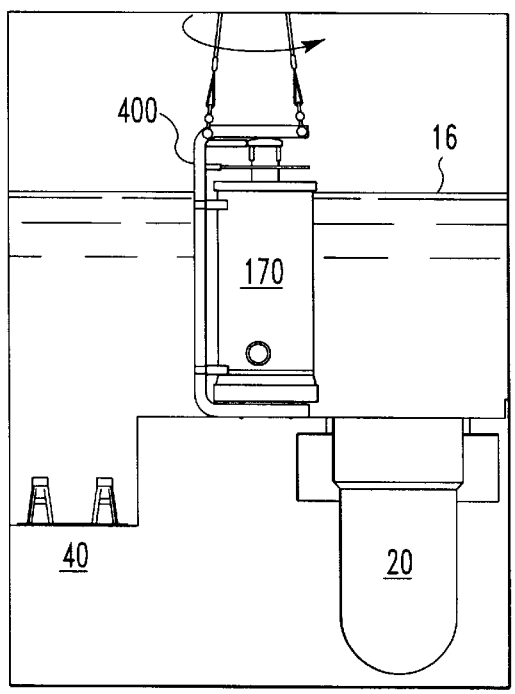
Figure 11G:
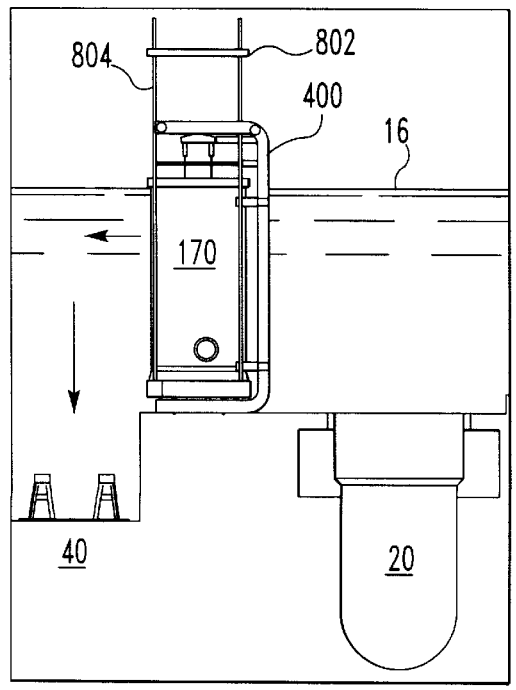
Figure 11H:
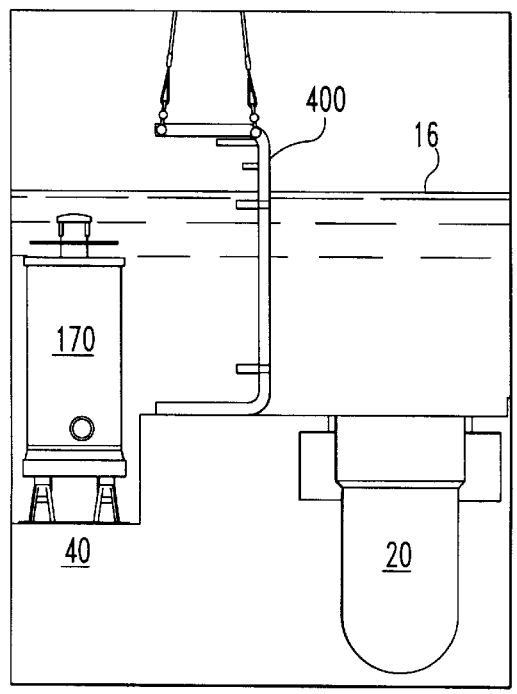

FIGS. 11A–11H show the up-ending procedure according to the present invention. The up-ending procedure is accomplished as follows. While the internal assemblies 120, 170 are still with in reactor vessel 100 (not shown), the upper internal assembly 120 and fuel cells 222 are removed as described above. The core support columns 200 are de-coupled from the lower internal assembly 170. As is known in the prior art, the lower internal assembly 170 is then removed from the reactor vessel 100 and placed on storage stands 42, 44. As shown in FIG. 11A, up-ending frame 400 is then positioned on the floor 12 between pit 20 and the maintenance bay 40. As shown in FIGS. 7A–7D, the spider assembly 500 is then installed, as described above, to support the baffle assembly 171 of the lower internal assembly 170. Installing the spider assembly 500 includes coupling the lifting plate 590 to the core barrel upper flange 173. The polar crane 70 is then coupled to the lifting plate 590. In the preferred embodiment, a harness 800 having three lifting rods 801 is coupled to lifting plate assembly 590 through lifting means 620. In the preferred embodiment, the lifting means 620 are threaded fasteners with threaded bore holes 622, and lifting rods 801 include threaded tips that may be engaged with the threaded bore holes 622. Crane 70 may then lift the lower internal assembly 170 off maintenance bay support structures 42, 44. As shown on FIG. 11B, using polar crane 70, the lower internal assembly 170 is then lifted to a position adjacent to the up-ending frame 400. The lower internal assembly 170 is then translated horizontally into the up-ending frame 400. Once positioned within frame 400, the lower internal assembly 170 is lowered until lower core support forging 179 rests on lower internal assembly support arc 446. As shown on FIG. 9C, cross bar 405 is attached between frame first members 410, 412. Cross bar 405 includes an L-shaped retainer 406 disposed on the medial portion of cross bar 405. The L-shaped retainer includes a tab 407 which extends downwardly adjacent to core barrel 172. Tab 407 prevents the lower internals 170 from tipping out of frame 400. As shown in FIG. 11C, the up-ending frame 400, which now holds lower internal assembly 170, is rotated on lower rounded corners 431 into a horizontal orientation. As shown in FIG. 11D, because the floor 12 in the preferred embodiment is at a higher elevation than maintenance bay floor 41. An additional A-frame support member 45 may be installed on maintenance bay storage stands 42, 44. Frame 400 is then translated horizontally until lower members 422, 424 rest on A-frame 45. As shown in FIG. 11E, the up-ending frame 400 is then pivoted about upper rounded corners 431, 433 until the frame 400 is in the inverted, vertical orientation. As shown in FIG. 11F, the up-ending frame 400 is then rotated 180 degrees about a central axis so that the open side of frame 400 is adjacent to the maintenance bay 40. The crane 70 is then detached from the frame assembly 400 and coupled to the lower internal assembly 170. In the preferred embodiment, the crane 70 is coupled to a four legged harness 802. Each leg of the four-legged harness 802 is a rod 804 having a threaded tip 805. The rods 804 pass through one of the harness openings 449 on frame lower plate assembly 440. Each rod 804 is lowered along the outside of the lower internal assembly 170 until each rod tip 805 engages threaded harness attachment holes 610, 612, 614, 616 on cross bars 602, 604. The crane 70 then lifts and translates the lower internal assembly 170 horizontally out of up-ending frame 400 and lowers the lower internal assembly 170 on to maintenance bay storage stands 42, 44. Thus, as shown in FIG. 11H, the procedure terminates with the lower internal assembly 170 being in an inverted orientation on the maintenance storage stands 42, 44. The re-inversion procedure consists of performing the above steps in reverse order.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of performing maintenance on a nuclear reactor lower internal assembly, where said lower internal assembly is located within a reactor vessel, said method comprising the steps of:

removing said lower internal assembly from said reactor vessel in an upright orientation;

inverting said lower internal assembly from said upright orientation;

performing maintenance on said lower internal assembly;

repositioning said lower internal assembly in a upright orientation; and reinserting said lower internal assembly in said reactor vessel.

2. The method of claim 1, wherein said lower internal assembly has an open ended cavity, and said removal step comprises:

providing a spider assembly sized to fit within said cavity and which provides an outward radial force; and installing said spider assembly within said cavity.

3. The method of claim 2, wherein said maintenance step comprises: providing a storage stand;

lifting said lower internal structure out of said reactor vessel;

positioning said lower internal assembly on said storage stand;

performing maintenance on said lower internal assembly.

4. The method of claim 3, wherein said reinserting step comprises:

positioning said lower internal assembly on said storage stand;

removing said spider assembly;

lifting said lower internal assembly off said storage stand;

lowering said lower internal assembly into said reactor vessel;

coupling said lower internal assembly to said reactor vessel.

5. The method of claim 2, wherein said lower internal assembly has an open ended cavity; and wherein said removal step further comprises:

providing a frame assembly adapted to receive said lower internal assembly;

lifting said lower internal structure out of said reactor vessel;

positioning said lower internal assembly within said frame;

attaching said lower internal assembly to said frame.

6. The method of claim 5, wherein said rotating step comprises:

providing a crane;

coupling said crane to said frame;

rotating said frame assembly with said crane.

7. The method of claim 6, wherein said inverting step further comprises:

providing said frame assembly with an arcuate portion;

rotating said frame assembly on said arcuate portion.

8. The method of claim 7 wherein said maintenance step comprises:

providing a storage stand;

removing said lower internal assembly from said frame assembly;

positioning said lower internal assembly on said storage stand;

performing maintenance on said lower internal assembly.

9. The method of claim 8, wherein said repositioning step comprises:

positioning said lower internal assembly in said frame assembly;

using said crane to reposition said frame assembly so that said lower internal assembly is in the upright orientation.

10. The method of claim 9, wherein said reinserting step comprises:

removing said lower internal assembly from said frame assembly;

positioning said lower internal assembly on said storage stand;

removing said spider assembly;

lifting said lower internal assembly off said storage stand;

lowering said lower internal assembly into said reactor vessel;

coupling said lower internal assembly to said reactor vessel.

* * * * *